Sept. 25, 1934.   S. A. CRONE   1,974,447
SAFETY SUPPORT FOR BRAKE MECHANISM
Filed Oct. 20, 1933
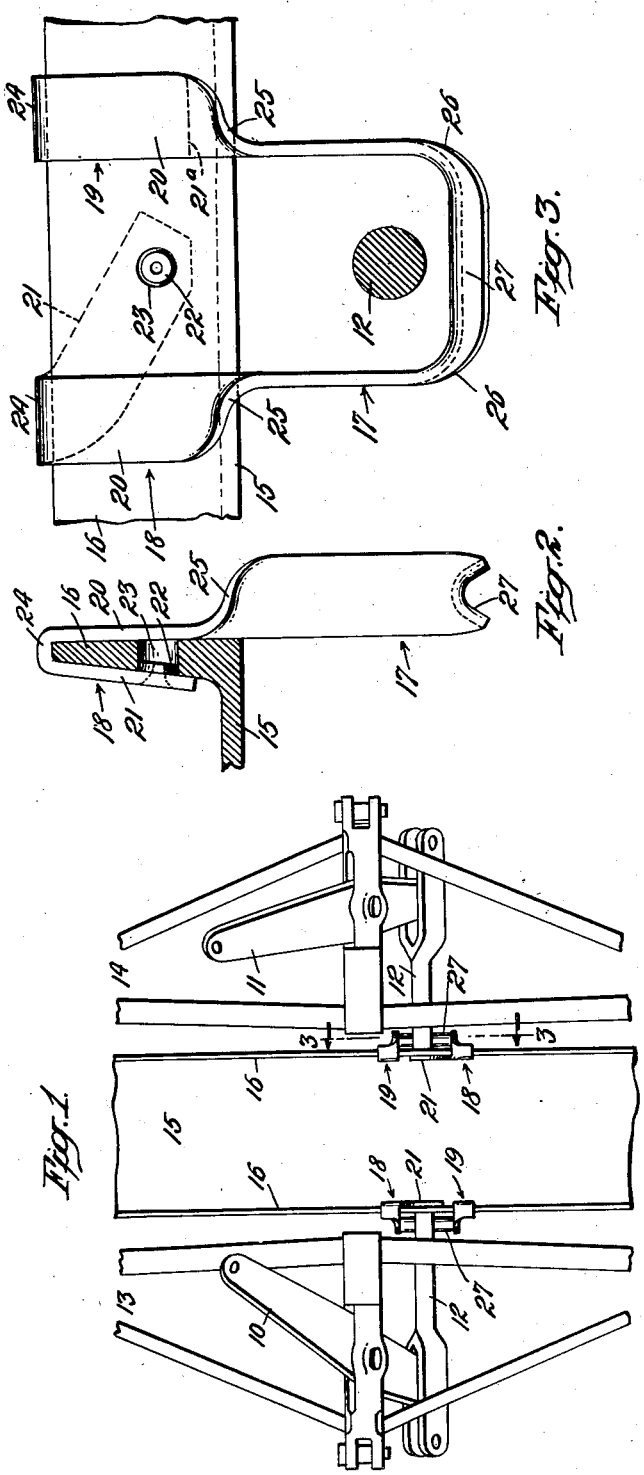
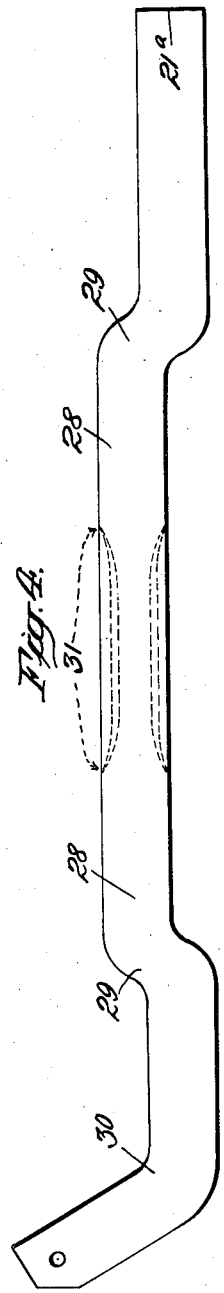
INVENTOR
SETH A. CRONE
BY Geo S. Wheelock
ATTORNEY Patented Sept. 25, 1934

1,974,447

UNITED STATES PATENT OFFICE 1,974,447

SAFETY SUPPORT FOR BRAKE MECHANISM

Seth A. Crone, East Orange, N. J., assignor to Buffalo Brake Beam Company, New York, N. Y., a corporation of New York Application October 20, 1933, Serial No. 694,411

12 Claims. (Cl. 188—210)

The present invention relates to safety supports for certain parts of brake mechanism which may be the brake beams, although the invention is more particularly directed to improved means for supporting the bottom connecting rod of brake levers in the event of its failure so that it tends to fall upon the track; and the invention is useful in connection with the safety support shown, described and claimed in U. S. Letters Patent to Seth A. Crone, No. 1,816,639, dated July 28, 1931.

An important object of the invention is to provide a safety support for such purposes, which is so constructed that it may be secured to a main supporting member of a car truck, as, for example, a spring plank, without requiring the use of rivets or similar fastenings, although as will appear herefrom rivets may be employed if so desired, in association with the improved safety support. The improved safety support may be used in connection with new car trucks or may be used in connection with old car trucks wherein the similarly located supports have failed from one reason or another, and in such case it may not be necessary to additionally drill the spring plank or the like with holes, as the same holes which had theretofore been used for the passage of rivets may be used in connection with the present improvements.

A particular object of the present invention is to provide a safety support which may be formed as an integral unit, or of more than one part as disclosed by the aforesaid patent, the portions of the support which are to be directly applied to a spring plank or the like being composed of resilient metal, such as rolled steel, and the resilient portions or the supporting member therefor having a suitable protuberance so that, when the resilient portions are sprung over the spring plank or the like, such protuberance will spring into a socket or recess, and thereby the safety support secured to the spring plank or the like in depending relation therewith, whereby to furnish a support for a bottom connecting rod or other member of the brake mechanism in case of failure.

These being among the objects of the present invention, the same consists of certain features of construction and combinations of parts to be hereinafter described and then claimed with reference to the accompanying drawing illustrating a preferred embodiment of the invention, in which:

Fig. 1 is a plan showing parts of the brake mechanism and the spring plank, with the improved supports applied thereto;

Fig. 2 is an enlarged section of the spring plank showing the improved safety support applied thereto, parts being indicated in broken lines, and the section for clearness shown passing through the point of attachment;

Fig. 3 is a section on the line 3—3 of Fig. 1 looking in the direction of the arrows, and Fig. 4 is a plan of a metal blank from which the improved support may be formed.

In Fig. 1 the live and dead levers 10, 11 are shown as connected by the usual bottom rod 12, the levers being pivotally mounted on the brake beams 13, 14, shown only in part. In the preferred embodiment of the invention the improvements are applied to the spring plank 15 having flanges 16 or they may be applied to any other supporting member such as a suitably constructed bolster.

In Figs. 2 and 3 the improved construction is fully shown, and wherein the safety support is provided with a stirrup member 17 and saddle members 18, 19, so that the preferred construction is on the whole formed in substantially a U-shape as shown in Fig. 3, although, for example, the stirrup member 17 and the saddle members 18, 19 may constitute separate pieces as disclosed in aforesaid patent. As shown, the stirrup member 17 and the saddle members are formed from one strip of resilient steel, such as rolled steel which is capable of being bent so as to retain its shape, but yet has more or less springiness, so that each saddle member 18, 19 which is formed in the nature of a bracket may be snugly engaged or sprung over the flanges 16 of the spring plank.

One leg 20 of each saddle member 18, 19 is adapted to fit squarely against the side of the spring plank and the other leg 21 or 21a is a spring leg and acts as a free tongue to engage snugly upon the inner surface of the flange of the spring plank. As shown, the free leg or tongue 21 of the saddle member 18, is provided with an inward protuberance, that is a protuberance that faces in the direction of the leg 20 of such saddle member. This protuberance 22 is in the nature of a boss or stud and is preferably formed by piercing the metal and drawing it slightly inwardly so as to form an annular or perforated boss or stud, but the same may be formed in any other desirable manner. Such protuberance 22 is adapted to automatically snap or spring into a hole 23 forming a socket in the flange of the spring plank, and when the safety support is applied in this manner for its support by the spring plank it will be held in fixed depending relation with the spring plank.

In the particular construction shown in Figs. 1, 2 and 3 each safety support will be provided with bends 24 at the top of the saddle member 18, 19; with twists 25 between the stirrup member 17 and the saddle members 18, 19, and with bends 26 at the lower corners of the stirrup member 17. Inasmuch as the stirrup member shown herein extends under the bottom rod 12 of the brake mechanism, its cross member 27 is preferably strengthened by arching it transversely, as clearly shown in Fig. 2.

While the improved safety support may be provided with more than one interengaging protuberance, it is preferably provided with but one of them for the sake of simplicity and economy. Therefore, under the preferred construction one of the free tongues or legs, such as 21, extends at an inclination towards the saddle member 19, so that its lower extremity is located between the saddle members 18, 19. This will dispose the protuberance 22 at a point midway of the saddle members 18, 19 on an imaginary vertical line bisecting the stirrup member 17. It will be understood that such a single protuberance 22 entering a single socket 23 constitutes all the fastening means necessary for supporting the safety support from a flange of the spring plank, inasmuch as the bends 24 rest upon the upper edge of the spring plank flange and each bend will prevent the other bend from rising if there should be a tendency of the support to rock on the centrally located securing means 22, 23.

The construction of the safety support specifically shown and described is advantageously formed from a single blank of rolled sheet steel, as shown in Fig. 4. This blank has an offset middle portion 28, laterally extending portions 29 and a laterally extending portion 30 directed in opposite direction from the portions 29. The portions of the safety support of Figs. 2 and 3 will be readily understood by comparison with corresponding portions of Fig. 4, and, as shown in Fig. 4, the broken lines 31 indicate where the blank is struck up in order to form the arch of the cross-member 27 of the stirrup 17. In order to form the safety support it is preferred to first twist the blank at 29 in order to form the twisted portions 25, and in so doing the portions 29 are strained or stretched slightly so as to bring the inner edges of the stirrup member 17 in alignment with the inner surfaces of the legs 20 of the saddle members, as fully shown in Fig. 2. Next it is preferred to form the bends 26 and the arched cross-section of member 27 of the stirrup member from the portion 28 of the blank. Finally, it is preferred to then bend over the end portions of the blank so as to provide the support with the two saddle members, the bend 24 for leg 21 being formed from the portion of the blank at 30.

Obviously the invention is susceptible of more or less modification without departing from the scope of the appended claims.

What I claim is—

1. In a safety support for brake mechanism, the combination of a main supporting member, a stirrup adapted to be supported thereby to establish a support for a part of the mechanism in case it drops, and a resilient saddle member for engagement upon the supporting member to support the stirrup thereon, one of the members having a protuberance and the other member having a socket adapted for mutual snap engagement when the stirrup is so supported.

2. In a safety support for brake mechanism, the combination of a main supporting member, a stirrup adapted to be supported thereby to establish a support for a part of the mechanism in case it drops, and a resilient saddle member for engagement upon the supporting member to support the stirrup thereon, the supporting member having a hole and the saddle member a protuberance adapted to snap into the hole when the stirrup is so supported.

3. In a safety support for brake mechanism, the combination of a main supporting member, a stirrup adapted to be supported thereby to establish a support for a part of the mechanism in case it drops, and a resilient saddle member for engagement upon the supporting member to support the stirrup thereon, the supporting member having a socket, and one leg of the saddle member having a struck-out boss or stud forming a protuberance adapted to snap into the hole.

4. In a safety support for brake rods, the combination of a main supporting member, a stirrup adapted to be supported thereby, a resilient bracket in the form of a saddle member in snug engagement over the supporting member to support the stirrup thereon so as to hang below the supporting member for establishing a support for the rod in case it drops, one of the members having a protuberance and the other member having a socket adapted for mutual snap engagement when the stirrup is so supported.

5. A safety support for brake mechanism, comprising a stirrup through which a bottom rod may pass, and a resilient saddle thereon having a protuberance adapted for snap engagement with a supporting member on which the saddle may be mounted.

6. A safety support for brake mechanism, comprising a stirrup member through which a bottom rod may pass, and a resilient saddle member thereon having a protuberance adapted for snap engagement with a supporting member on which the saddle may be mounted, the two members of the support being integral with each other.

7. A safety support for brake mechanism, comprising a loop-shaped stirrup, and two resilient saddle members for supporting opposite sides of the stirrup, one of the saddle members having a protuberance for snap engagement with a supporting member on which the saddle members may be mounted.

8. A safety support for brake mechanism, comprising a loop-shaped stirrup, and two resilient saddle members for supporting opposite sides of the stirrup, one of the saddle members having a protuberance for snap engagement with a supporting member on which the saddle members may be mounted, the protuberance being located on a line extending approximately midway between the sides of the stirrup.

9. A safety support for brake mechanism, formed from a single strip of bendable resilient metal, and including a loop-shaped stirrup formed by the middle portion of the strip, and two saddle members formed from the end portions of the strip and providing two opposed leaves to each member, one of the leaves having an inward protuberance for snap engagement with a supporting member on which the saddle members may be mounted.

10. A safety support for brake mechanism, formed from a single strip of bendable resilient metal, and including a loop-shaped stirrup formed by the middle portion of the strip, and two saddle members formed from the end portions of the strip and providing two opposed leaves to each member, one of the leaves having an inward protuberance for snap engagement with a supporting member on which the saddle members may be mounted, such one leaf being inclined relatively to its opposed leaf and extending toward the other saddle member to position its protuberance on a line extending approximately midway between the sides of the stirrup.

11. In a safety support for the bottom connecting rod of a brake mechanism, the combination of a spring plank constituting a flanged supporting member, a resilient saddle member engaged over the flange, one of the members having a socket and the other member having a protuberance adapted to snap into the socket, and a stirrup supported by the saddle member and through which the bottom rod may pass, and adapted to support such rod if it drops.

12. In a safety support for brake mechanism, the combination of a main supporting member, a stirrup adapted to be supported thereby to establish a support for a part of the mechanism in case it drops, and a bracket supporting the stirrup together with means for automatically securing the bracket on the supporting member.

SETH A. CRONE.